UNITED STATES PATENT OFFICE.

KALIL DAVID, OF WORCESTER, MASSACHUSETTS.

REMEDY FOR SYPHILIS.

1,086,900.　　　Specification of Letters Patent.　　Patented Feb. 10, 1914.

No Drawing.　　Application filed February 28, 1913.　Serial No. 751,242.

*To all whom it may concern:*

Be it known that I, KALIL DAVID, a subject of the Ottoman Empire, residing at Worcester, in the county of Worcester and State of Massachusetts, have invented a new and useful Remedy for Syphilis, of which the following is a specification.

The principal ingredient of my remedy is the seed of a plant which is a species of *Convolvulus* growing wild in Arabia and particularly around Damascus and is well known in that region as the "neal" plant, and known botanically as *Ipomœa nil* (L) Roth. These seeds are substantially smooth, hairless, black and triangular in cross section. I preferably use the seed in a powdered or comminuted condition.

For an ointment, I employ 1 dr. neal seed, preferably with their shells or skins, ground, mixed with a suitable quantity of water and the following ingredients: $\frac{1}{2}$ dr. Brduomat-vitriol, (ferric sulfate,) $2\frac{1}{2}$ dr. asafetida, 3 dr. calomel, 6 dr. ground nuts of the cypress tree, 10 dr. henna (*Lawsonia inermis*). $1\frac{1}{4}$ dr. citric acid with or without oxalic acid, 2 dr. sabadilla seed, $4\frac{1}{2}$ dr. powdered gall nuts, 3 dr. dried powdered ground leaches. After mixing the above ingredients with water I thoroughly mix the compound with one dr. powdered corrosive sublimate dissolved in water, the mixing being continued until the mass comes to the consistency of putty, when it is ready for use.

As a salve I take $\frac{1}{2}$ lb. of quassia, 1 qt. of grape wine, 1 oz. corrosive-sublimate and put the mixture in a tightly covered pot on a fire; after this mixture is heated I drain off the liquid and mix the residue with the following ingredients which have before been mixed together in a separate mass: 4 oz. asafetida, 3 oz. verdigris, $2\frac{1}{2}$ oz. sal ammoniac, $1\frac{1}{2}$ oz. citric acid with or without oxalic acid, 5 oz. henna, 6 oz. aloes, 4 oz. gall nuts, $2\frac{1}{2}$ oz. zinc sulfate, 1 oz. sabadilla seed, 1 oz. sweet or olive oil, $\frac{1}{2}$ oz. powdered neal seed.

This remedy preferably is employed in conjunction with a drastic method of treating syphilis, this treatment being so severe that numerous sores appear all over the body as well as internally. The principal office of the salve is to sooth and heal these sores.

Having thus described my invention, what I claim as new and desire to secure by Letters Patent is:—

1. A medicinal salve or ointment for use as an external remedy for syphilis, containing ground smooth black neal seed (*Ipomœa nil* (L) Roth).

2. A medicinal salve or ointment for use as an external remedy for syphilis containing neal seed (*Ipomœa nil* (L) Roth), asafetida, citric acid, sabadilla seed, and corrosive sublimate.

3. A medicinal salve or ointment for use as an external remedy for syphilis containing neal seed (*Ipomœa nil* (L) Roth,) asafetida, citric acid, sabadilla seed, ferric sulfate, calomel, ground nuts of the cypress tree, ground powdered leaches, and corrosive sublimate.

4. A medicinal salve or ointment for use as an external remedy for syphilis, containing substantially 1 dram ground smooth black neal seed (*Impomœa nil* (L) Roth), $\frac{1}{2}$ dram ferric sulfate, $2\frac{1}{2}$ drams asafetida, 3 drams calomel, 6 drams ground nuts of the cypress tree, 10 drams henna (*Lawsonia inermis*), $1\frac{1}{4}$ drams citric a cid, 2 drams sabadilla seed, $4\frac{1}{2}$ drams powdered gall nuts, and 3 drams dried powdered ground leaches, and one dram powdered corrosive sublimate, dissolved in water.

In testimony whereof I have hereunto set my hand, in the presence of two subscribing witnesses.

his
　　　　　　　　KALIL  ✗  DAVID.
　　　　　　　　　　　　　　　mark

Witnesses:
　ALBERT E. FAY,
　S. SUYDAM.